Patented Apr. 27, 1948

2,440,364

UNITED STATES PATENT OFFICE 2,440,364

DYE COMPOSITION

William J. Champion, La Grange, Ill., assignor to Ditto, Incorporated, Chicago, Ill., a corporation of West Virginia No Drawing. Application December 24, 1943, Serial No. 515,620

1 Claim. (Cl. 106—272)

The invention relates to a method of treating dyes, and more particularly relates to a method of treating water or spirit soluble dyes to make them particularly suitable for use in coating compositions for making hectograph or direct process carbon papers, ribbons and the like. The invention includes dye compositions containing such treated dyes.

Coating compositions for coating hectograph or direct process carbon papers, ribbons and the like, contain a suspension of a water or alcohol soluble dye in an oil-wax solution. It is desirable to incorporate as high a percentage as possible of dye in the oil-wax solution. However, when the proportion of dye exceeds a certain amount, depending upon the type of dye, the particle size of the dye, and the oil absorption of the dye used, the coating solutions become quite viscous, flow with great difficulty, and are not suitable for coating on to paper or ribbon. This phenomena of thickening is known as thixotropy.

I have discovered that suspensions of water or alcohol soluble dyes in oil-wax solutions (sometimes called carbon dopes) owe in part their thixotropic properties to the fact that water is present in all water or alcohol soluble dyes prepared by processes known to the art. So far as I know every method of manufacturing water or alcohol soluble dye involves the use of large amounts of water. While it is true that the moist dye cake after manufacturing process is ordinarily placed in shell trays which are placed in a stationary vacuum dryer to remove moisture usually at elevated temperature (50°–70° C.) and obtain the dye in a powdered form this method ordinarily makes a dye which contains above about two percent by weight of water, and so far as I know no water and alcohol soluble dyes have been made which contain less than one-half percent of water. In order to bring the water content of a dye down to say one percent by ordinary vacuum drying methods, it will be necessary to dry the dye for a period of time and at such a temperature that considerable decomposition of the dye will take place. For example, crystal violet and similar types of water or alcohol soluble aniline dyes would lose HCl and revert in part back to their dye base.

In accordance with one embodiment of this invention, a water or alcohol soluble dye is dried by placing the dyestuff under vacuum in the presence of a drying agent such as phosphorous pentaoxide. Heating to 50°–70° C. will speed up this drying, but is not necessary. Under these conditions dyes have been produced which contain less than one-half percent by weight of water, such as, for example, one-tenth percent. Many other types of drying agents can be used such as, for example, lithium chloride, aluminum chloride, sulphuric acid, magnesium perchlorate, and the like.

This treatment may be applied to all types of water or alcohol soluble dyes, particularly basic dyes or aniline dyes such as crystal violet, Bismarck brown, brilliant green, fuchsin, and chrysoidine.

The dry dye so obtained is ground into a suspension in an oil-wax solution. Such oil-wax solutions containing dyes which have present several percent of water, are well known to the art. The following example illustrates one coating composition which has given satisfactory results for coating carbon paper and hectograph ribbon:

| | Per cent by weight |
|---|---|
| Monohydrochloride of hexamethyl-pararosaniline (crystal violet) | 58 |
| Carnauba wax | 14 |
| Mineral oil | 28 |

In preparing these coating compositions, care is taken not to introduce water into the composition. Waxes and oil ordinarily contain very little moisture. These traces can be readily removed by heating to 150–160° C. for a short while before they are mixed into the dry dye.

The dyes and the coating compositions of my invention contain less than a half percent by weight of water and preferably contain less than two-tenths percent of water. Under such conditions coating compositions may be obtained which contain very high percentages of dyestuffs, ranging from above 55% dye to 67% dye, depending upon the type, purity, oil absorption, particle size, of the dye material. I have been able to produce free flowing compositions of pure crystal violet known as Du Pont Extra Pure crystal violet in a wax-oil solution having 58% dye. With a crystal violet dye sold by Du Pont under the name Extra Pure A. P. N., I have been able to obtain suspensions which are fluid even when 65 to 67% dye is present, whereas by the use of such a dye from which the water has not been removed by my process thixotropic difficulties are encountered when the dye content is above about 63%.

While there have been shown and described certain embodiments of the invention, it is to be understood that it is capable of many modifications. Changes, therefore, may be made without departing from the spirit and scope of the invention as described in the appended claim, in which it is the intention to claim all novelty inherent in the invention as broadly as possible, in view of the prior art.

I claim:

A coating composition consisting of a suspension of a dye selected from the group consisting of water and alcohol soluble dyes in a wax and mineral oil solution, said composition containing less than one-half percent of water and from 55 to 67 percent by weight of said dye, the wax being present in substantial amount and the oil being present in greater amount than the wax and sufficient to give a free-flowing composition under coating conditions.

WILLIAM J. CHAMPION.

REFERENCES CITED

The following references are of record in the file of this patent:

UNITED STATES PATENTS

| Number | Name | Date |
|---|---|---|
| 2,377,172 | Murphy | May 29, 1945 |
| 2,155,861 | Hughes | Apr. 25, 1939 |
| 2,124,590 | Reed | July 26, 1938 |
| 1,798,175 | Smith | Mar. 31, 1931 |
| 1,595,690 | Schwarzkopf | Aug. 10, 1926 |
| 1,589,504 | Agopian | June 22, 1926 |
| 1,533,053 | Wilson | Apr. 7, 1925 |
| 1,402,195 | Trumbull | Jan. 3, 1922 |

FOREIGN PATENTS

| Number | Country | Date |
|---|---|---|
| 118,435 | Great Britain | Aug. 26, 1918 |